Patented Oct. 18, 1938

2,133,290

UNITED STATES PATENT OFFICE 2,133,290

ANODIC OXIDATION OF FERRO-PHOSPHORUS

Lewis H. D. Fraser, Sheffield, Ala.

No Drawing. Original application October 15, 1936, Serial No. 105,810. Divided and this application January 7, 1938, Serial No. 183,795

3 Claims. (Cl. 204—9)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a process for the anodic oxidation of ferro-phosphorus and certain new compositions of matter resulting therefrom.

This application is a division of my original App. Ser. No. 105,810, filed October 15, 1936.

One of the objects of this invention is to provide a process for the conversion of ferro-phosphorus, a by-product from the production of elemental phosphorus in a blast furnace or an electrical reduction furnace, into useful phosphates. Another object of this invention is to provide a method for the conversion of ferro-phosphorus into phosphates which is more economical than those heretofore used. Other objects of this invention include the production of finely divided iron oxide, the particle size of which is of colloidal dimensions and which may be used as a paint pigment or a rouge, and the production of finely divided basic iron phosphate, the particle size of which is of colloidal dimensions and which may be used as a paint pigment or a fertilizer by the anodic oxidation of ferro-phosphorus in aqueous electrolytes.

Four iron phosphides, $Fe_3P$, $Fe_2P$, $FeP$, and $FeP_2$, which contain 15.6, 21.7, 35.7, and 52.6% phosphorus respectively, are known. Commercial iron phosphide, commonly called ferro-phosphorus, usually contains 14.5 to 28.5% phosphorus. The commercial material does not, therefore, contain an amount of phosphorus corresponding exactly to any one iron phosphide. Ferro-phosphorus containing 15.6 to 21.7% phosphorus is usually considered as being a mixture of $Fe_3P$ and $Fe_2P$, while material containing more than 21.7% is considered a mixture of $Fe_2P$ and another phosphide richer in phosphorus. Although this description is not limited to ferro-phosphorus of any one composition, its iron phosphide content is discussed in an illustrative manner as though it was the iron phosphide, FeP.

I have discovered a process for converting the phosphorus contained in ferro-phosphorus into phosphates by the anodic oxidation of the ferro-phosphorus in an aqueous solution of an electrolyte containing an inorganic compound such as an alkali metal hydroxide, an alkali metal salt of an inorganic acid, an inorganic acid, or a mixture of such a salt with an inorganic acid or an alkali metal hydroxide. The use of an alkali metal hydroxide in the electrolyte results in the formation of an alkali metal phosphate, the use of an alkali metal salt or inorganic acid in the electrolyte results in the formation of a basic iron phosphate, and the use of inorganic acid in an electrolyte results in the formation of an acid iron phosphate. When mixtures of salts and acids or salts and hydroxides are used as electrolytes the products resemble those obtained with both of the pure ingredients used as electrolytes individually.

In the several examples which follow, samples of ferro-phosphorus were made anodes in cells containing aqueous solutions of a base, a salt or an acid employing chemically inert cathodes. Electrolysis was carried on in these electrolytes under known conditions of direct current, anode current density, temperature, cell voltage and power input until an appreciable quantity of ferro-phosphorus had been consumed, at which time the electrolysis was terminated. The electrodes were then removed from the electrolytes and the losses in weight of ferro-phosphorus were determined after cleaning. Any insoluble products present in the electrolytes after electrolysis were filtered out and washed substantially free from the electrolytes with a small amount of water. Wash water used was combined with the filtrate and the total volume measured. The insoluble products were dried, weighed and analyzed for the chemical constituents of interest (principally iron, total phosphorus, water soluble phosphate and phosphate insoluble in neutral ammonium citrate solution). The filtrates were analyzed for their phosphorus pentoxide contents, reported as grams of $P_2O_5$ per liter of solution, and for any other ingredients of interest. The current and energy efficiencies obtained for the oxidation of the phosphorus and ferro-phosphorus were calculated for each experiment from the ampere hours and kilowatt hours employed, and the amounts of $P_2O_5$ recovered as water soluble phosphate and neutral ammonium citrate soluble phosphate.

One example of the operation of my process is given for the anodic oxidation of ferro-phosphorus in a basic electrolyte. A direct current of approximately 10 amperes was passed for 98.5 hours at an anodic current density of approximately 15 amperes per square foot through ferro-phosphorus as an anode and graphite as a cathode in 5 liters of potassium hydroxide solution containing 280.5 grams of KOH per liter. At the termination of the electrolysis, the sludge was filtered, washed and dried. A filtrate, 8.05 liters, was found to contain phosphate equivalent to 270 grams of $P_2O_5$ and no $R_2O_3$ ($Fe_2O_3+Al_2O_3$). The amount of phosphorus converted into soluble phosphate by the use of 1023 ampere hours, as indicated by the increase in weight of the cathode in a copper coulometer which was in series with the cell during the electrolysis, (0.263 grams of $P_2O_5$ per ampere hour) corresponded to a current efficiency of 79.5%. An average cell voltage of 2.0 volts was recorded, corresponding to a total power input of 2.05 kilowatt hours and a power consumption of 3.45 kilowatt hours per pound of total $P_2O_5$ produced. The dried sludge contained 73.3% $Fe_2O_3$ and 17.7% $P_2O_5$, the latter being water insoluble and insoluble in neutral ammonium citrate solution.

Another example for the operation of my process is given for the anodic oxidation of ferro-phosphorus in a saline electrolyte. A direct current of approximately 5 amperes was passed for 137 hours at an anodic current density of approximately 10 amperes per square foot through ferro-phosphorus as an anode and lead as a cathode in 5 liters of a potassium chloride solution containing 372.75 grams of KCl per liter. At the termination of the electrolysis, the sludge was filtered, washed and dried. A filtrate, 4.8 liters, was found to contain phosphate equivalent to 2.9 grams $P_2O_5$ per liter. The dried sludge contained total phosphate equivalent to 19.03% $P_2O_5$ and 44.5% $Fe_2O_3$. Although the phosphate contained in the dried sludge was insoluble in water, 70.5% of the total $P_2O_5$ or 13.4% on the basis of the dry sludge, was nevertheless, citrate soluble and, therefore, available from a plant nutrient standpoint. The amounts of phosphorus converted into available phosphate by the use of 582 ampere hours, as indicated by the increase in weight of the cathode in a copper coulometer which was in series with the cell during the electrolysis (0.190 grams of $P_2O_5$ per ampere hour) corresponded to a current efficiency of 57.5%. An average cell voltage of 1.9 volts was recorded, corresponding to a total power input of 1.105 kilowatt hours and a power consumption of 4.54 kilowatt hours per pound of total available $P_2O_5$ produced.

Still another example of the operation of my process is given for the anodic oxidation of ferro-phosphorus in an acid electrolyte. A direct current of 5 amperes was passed for 128 hours at an anodic current density of approximately 10 amperes per square foot through a ferrophosphorous anode and a sheet lead cathode in 5.0 liters of phosphoric acid, containing 188.1 grams of $P_2O_5$ and 0.34 grams of $Fe_2O_3$ per liter. At the termination of the electrolysis the solution resulting, 5.675 liters, was found to contain phosphate equivalent to 177.2 grams of $P_2O_5$ and 27.6 grams of $Fe_2O_3$ per liter. The difference between the final and initial $P_2O_5$ contents of the electrolyte of 55 grams $P_2O_5$ obtained by the use of 582 ampere hours, as indicated by the increase in weight of the cathode in a copper coulometer in series with the cell during the electrolysis, (0.094 grams of $P_2O_5$ per ampere hour) corresponded to a current efficiency of 28.4% computed on the basis of the oxidation of phosphorus from a negative valence of 3 to a positive valence of 5. An average cell voltage of 1.7 volts was recorded, corresponding to a total power input of 0.99 kilowatt hours and a power consumption of 8.15 kilowatt hours per pound of total $P_2O_5$ produced in solution.

It is evident that there are numerous factors which will influence conditions for the most satisfactory operation of my invention, the actual limits of which cannot be established except by a detailed study of each set of raw materials and the intermediate and finished products involved.

Ferro-phosphorus is cast in flat slabs suitable for use as electrodes in electrolytic cells. These slabs may be cast after the separation of the ferro-phosphorus from the furnace slag either at the time of tapping the ferro-phosphorus from a phosphate reduction furnace or subsequent thereto. The ferro-phosphorus slabs are made the anodes of a plurality of cells arranged in series electrically and, in order to obtain the maximum anode area, these slabs are mounted centrally between their respective pairs of cathodes in each cell.

The cathodes are constructed of a conductor of electricity which is essentially chemically inert to the conditions of operation in the electrolyte used. I have found lead and carbon to be generally suitable for this purpose but cathodes made of other material, such as steel and copper for use in alkaline electrolytes, are also suitable. The nature of the cathode will vary depending upon the nature and composition of the electrolyte used.

The electrolysis is carried on continuously with the shunting of individual cells for the replacement of anodes as these are used up or for the removal of electrolyte. The electrolyte can be introduced discontinuously but it is preferable to permit a continuous admission of the electrolyte and a continuous withdrawal of some of the partially spent electrolyte containing the phosphate produced continuously.

The disposition of the filtrate and solid products obtained by the anodic oxidation of ferro-phosphorus is dependent upon the nature of the original electrolyte used and the type of product desired.

When an aqueous solution of a strong base, such as sodium hydroxide or potassium hydroxide, is employed as the electrolyte, the products obtained from the anodic oxidation of ferro-phosphorus are iron oxide in finely divided form and the tertiary phosphate of the metal of the base originally used as the electrolyte. When the electrolysis has progressed sufficiently to produce either a desired concentration of phosphate ions in solution or a sludge of desired density, the electrolyte is pumped to a filter to remove the iron oxide sludge and the tertiary alkali metal phosphate is recovered by evaporation, cooling, crystallization, and filtration from the mother liquor, which is returned to the electrolytic cells with additional base and water. With proper filtration and washing methods employed, the salt is found to be free from heavy metals and the iron oxide product will have only traces of the alkali metal phosphate present. The solution containing the alkali metal phosphate may be regenerated after the iron oxide sludge has been removed by the addition of an alkaline-earth metal base, the phosphate of which is insoluble in alkaline solutions. This reaction need not be carried to completion as a small amount of phosphate ion present in the electrolyte returned to the cell has no deleterious effect. By the use of lime a fertilizer product could be produced very cheaply with the purchase of only a sufficiently strong alkali to make up for the small losses inherent in the process.

When the original electrolyte consists of an aqueous solution of a strong base, the iron oxide sludge produced is found to be nearly free of phosphorus at high current densities while at low current densities more unoxidized ferrophosphorus is found in the iron oxide sludge. The phosphorus oxidation current and energy efficiencies are considerably higher at low current densities (5 to 50 amperes per square foot) than at very high current densities (about 100 amperes per square foot).

When an aqueous solution of a salt of a strong base and a strong acid (such as sodium chloride or potassium chloride) is employed, the electrolyte is found to be changed but slightly in strength on prolonged electrolysis, the major change being the oxidation of the ferro-phosphorus to a mixture of iron hydroxide or oxide and iron phosphate. When a chloride is used as the electrolyte the filtrate obtained after the separation of the basic iron phosphate is returned to the cells with the addition of the amount of salt necessary to restore it to its original concentration. The chlorine evolved during electrolysis may be combined with a part of the hydrogen produced at the cathode and may be returned to the system as hydrochloric acid.

When an aqueous solution of a strong inorganic acid is used, the product obtained is an acid iron phosphate. With a sufficiently high acidity maintained in the electrolyte the oxidation products are all found in solution in the form of iron ions and phosphate ions, otherwise on continuing the electrolysis, the oxidation products will appear as a water insoluble acid iron phosphate. The use of an aqueous solution of phosphoric acid as the electrolyte results in the final production of water insoluble iron phosphate containing essentially all the phosphorus added as phosphoric acid and as ferro-phosphorus.

The use of electrolytes containing sodium hydroxide, potassium hydroxide, sodium chloride, potassium chloride, and phosphoric acid have been discussed in considerable detail. This invention is not, however, limited to the use of these particular electrolytes since solutions of other salts, such as the nitrate, phosphate, or sulfate, and other acids, such as hydrochloric, nitric, and sulfuric, may also be used. Furthermore, the electrolyte may be a solution of a hydroxide and a salt or it may be a solution of a salt and an inorganic acid.

The basic iron oxide and the basic iron phosphate obtained, using a solution of an hydroxide and a solution of salt, respectively, are believed to be new, particularly in respect to their particle size which is of colloidal dimensions. When these insoluble materials are separated from the electrolyte, washed and dried, they naturally agglomerate on drying. This agglomerate may be readily disintegrated so that the resulting powder may be used for various purposes, such as pigment for use in paint, rouge or rubber, where the colloidal nature of the material imparts distinctly improved characteristics to the resulting products.

Certain terms used throughout the description and claims are understood to have the following meaning: anode current density is the constant current employed divided by the total immersed surface of the anode and is expressed in amperes per square foot of anode area; current efficiency is arbitrarily calculated as the number of grams of phosphorus oxidized to water soluble and neutral ammonium citrate soluble phosphate divided by the number of grams of phosphorus which would be theoretically oxidized from a negative valence of 3 to a positive valence of 5 by the use of the number of ampere hours employed, neglecting the ampere hours consumed in oxidizing the iron content of the ferro-phosphorus; and energy efficiency is the amount of phosphorus which is oxidized to water soluble and neutral ammonium citrate soluble phosphate per unit of electrical energy consumed.

It will be seen, therefore, that this invention actually may be carried out by the modification of certain details without departing from its spirit or scope.

I claim:

1. Process of making iron oxide and sodium phosphate from ferro-phosphorus, which comprises, making ferro-phosphorus an anode in an electrolyte consisting of an aqueous solution of sodium hydroxide, containing from 10% NaOH by weight to a saturated solution; making a conductor, chemically inert as a cathode, a cathode; passing a direct current, at an anode current density of 5 to 50 amperes per square foot, between the anode and the cathode to produce a solution of the sodium phosphate and the insoluble iron oxide; and separating the insoluble iron oxide from the solution containing the sodium phosphate.

2. Process of making iron oxide and potassium phosphate from ferro-phosphorus, which comprises, making ferro-phosphorus an anode in an electrolyte consisting of an aqueous solution of potassium hydroxide containing from 10% KOH by weight to a saturated solution; making a conductor, chemically inert as a cathode, a cathode; passing a direct current, at an anode current density of 5 to 50 amperes per square foot, between the anode and the cathode to produce a solution of the potassium phosphate and the insoluble iron oxide; and separating the insoluble iron oxide from the solution containing the potassium phosphate.

3. Process of making iron oxide and an alkali metal phosphate from ferro-phosphorus, which comprises, making ferro-phosphorus an anode in an electrolyte consisting of an aqueous solution of an alkali metal hydroxide; making a conductor, chemically inert as a cathode, a cathode; and passing a direct current, at an anode current density of not more than 100 amperes per square foot, between the anode and the cathode to produce a solution of the alkali metal phosphate and the iron oxide.

LEWIS H. D. FRASER.

CERTIFICATE OF CORRECTION.

Patent No. 2,133,290. October 18, 1938.

LEWIS H. D. FRASER.

It is hereby certified that error appears in the printed specification of the above numbered patent requiring correction as follows: Page 3, first column, line 6, for the word "about" read above; and that the said Letters Patent should be read with this correction therein that the same may conform to the record of the case in the Patent Office.

Signed and sealed this 6th day of December, A. D. 1938.

Henry Van Arsdale (Seal)

Acting Commissioner of Patents.